(12) United States Patent
Lutz

(10) Patent No.: US 7,975,651 B2
(45) Date of Patent: Jul. 12, 2011

(54) METHOD OF SEQUESTERING CARBON DIOXIDE IN AQUEOUS ENVIRONMENTS

(76) Inventor: Michael J. Lutz, Key Biscayne, FL (US)

( * ) Notice: Subject to any disclaimer, the term of this patent is extended or adjusted under 35 U.S.C. 154(b) by 1111 days.

(21) Appl. No.: 11/494,681

(22) Filed: Jul. 26, 2006

(65) Prior Publication Data

US 2007/0028848 A1    Feb. 8, 2007

Related U.S. Application Data

(60) Provisional application No. 60/703,271, filed on Jul. 27, 2005.

(51) Int. Cl.
*A01K 61/00* (2006.01)
*A01G 31/00* (2006.01)
*A01G 33/00* (2006.01)
*B08B 1/00* (2006.01)
*A01H 13/00* (2006.01)
*A01B 79/00* (2006.01)

(52) U.S. Cl. ........... 119/215; 119/231; 95/236; 210/602

(58) Field of Classification Search .................. 119/215, 119/231; 95/236; 210/602; 422/40, 41
See application file for complete search history.

(56) References Cited

U.S. PATENT DOCUMENTS

| | | | | |
|---|---|---|---|---|
| 5,011,604 A | * | 4/1991 | Wilde et al. ................... | 210/602 |
| 5,965,117 A | * | 10/1999 | Howard et al. ............. | 424/78.26 |
| 5,992,089 A | * | 11/1999 | Jones et al. ................ | 47/58.1 R |
| 6,056,919 A | * | 5/2000 | Markels, Jr. .................... | 422/40 |
| 6,190,301 B1 | * | 2/2001 | Murray et al. ................ | 588/250 |
| 6,408,792 B1 | * | 6/2002 | Markels, Jr. .................. | 119/231 |
| 6,440,367 B2 | * | 8/2002 | Markels, Jr. .................... | 422/40 |
| 2004/0161364 A1 | * | 8/2004 | Carlson ........................... | 422/41 |

OTHER PUBLICATIONS

Lutz, M.J. et al, 2002, "Regional variability in the vertical flux of particulate organic carbon in the ocean", Blobal Biogeochemical Cycles (16)3, 1037.
Suess, E., 1980, "Particulate organic carbon flux in the oceans-surface productivity and oxygen utilization", Nature, 288, 260-263.

* cited by examiner

*Primary Examiner* — Duane Smith
*Assistant Examiner* — Ives Wu
(74) *Attorney, Agent, or Firm* — Lumen Patent Firm

(57) ABSTRACT

The present invention provides a method of sequestering carbon dioxide in aqueous environments. In a first step, an area is assessed to determine whether the area is capable of supporting the addition of organisms of higher trophic level (OHTL). Next, OHTL are added to the area in order to produce enough rapidly sinking and refractory particulate matter (PM) to sequester carbon dioxide above the level of carbon dioxide sequestration that exists before the addition of OHTL. Preferably, the PM produced by the OHTL sinks at rates significantly greater than and/or is significantly less biodegradable than that produced by other components of the biological carbon pump. Finally, this increase in the level of carbon dioxide sequestration is quantified. The method of the present invention may also include the step of reporting the quantified increase in the level of carbon dioxide sequestration.

24 Claims, 2 Drawing Sheets

METHOD OF SEQUESTERING CARBON DIOXIDE IN AQUEOUS ENVIRONMENTS

CROSS-REFERENCE TO RELATED APPLICATIONS

This application claims priority from 60/703,271, filed Jul. 27, 2005, which is incorporated herein by reference.

FIELD OF THE INVENTION

The present invention relates generally to carbon dioxide storage. More particularly, the present invention relates to methods of sequestering carbon dioxide in aqueous environments.

BACKGROUND

Use of the Earth's resources has resulted in global scale environmental problems including elevated atmospheric carbon dioxide ($CO_2$) concentrations and significant depletion of living marine resources. As a result of land use change and the burning of fossil fuels, atmospheric $CO_2$ levels are predicted to double in as little as 60 years. It is expected that elevated atmospheric concentrations of $CO_2$ and other greenhouse gases will facilitate greater storage of heat within the atmosphere leading to enhanced surface temperatures and rapid climate change. The impact of climate change will likely be economically expensive and environmentally hazardous. Reducing potential risks of climate change will require sequestration of atmospheric $CO_2$.

Methods proposed to capture and store atmospheric $CO_2$ include storage in geological formations, injection into the deep ocean, and uptake by phytoplankton via fertilization of the ocean. The limited capacity and duration, expense, and environmental outcomes of these methods are largely unresolved and may prohibit their utility.

The most economically and environmentally plausible manner to sequester atmospheric $CO_2$ is to enhance natural sinks. Natural options avoid the costs associated with industrial separation, capture, compression, and storage of carbon dioxide, and reduce potential negative environmental side effects. Natural methods offer reservoirs of large capacity and the ability to replace the carbon from whence it came, the long-term carbon cycle. Enhancing forest growth is an example of a natural method of carbon sequestration that is environmentally benign and, with proper management, allows for the value-added option of sustainable forestry harvest. The largest natural carbon reservoirs include ocean waters and marine sediments.

The flux of organic matter from surface waters to the deep ocean has a direct influence on the partitioning of $CO_2$ between the ocean and the atmosphere. In general, the greater depth that particulate organic carbon (POC) sinks to before remineralization, the longer time it takes to return to surface waters as dissolved carbon where it may reenter the atmospheric carbon cycle. Carbon that reaches the intermediate and deep ocean is entrained in water masses that have longer flow pathways back to the surface and smaller advective water velocities than in the upper ocean. The thermohaline ventilation of ocean interior waters occurs on time scales ranging from between annual and hundreds years in the upper ocean (approximately <2 km) to up to a 1000 years in the deep ocean (approximately >2 km). Buried carbon entering the geological record will be isolated from the atmosphere for millions of years. Thus, an effective method of carbon dioxide sequestration would be to promote the flux of organic matter from surface waters to the deep ocean. Accordingly, there is a need in the art to develop methods of promoting this flux for the purposes of carbon dioxide sequestration.

SUMMARY OF THE INVENTION

The present invention provides a method of sequestering carbon dioxide in aqueous environments. The present invention is based on the inventor's observation that organisms of higher trophic level (OHTL), such as planktivorous fish, carnivorous fish, and marine mammals, constitute a highly efficient and significant portion of the biological carbon pump, an ecological mechanism for sequestering carbon dioxide in the deep ocean. According to the method of the present invention, an area is first assessed to determine whether the area is capable of supporting the addition of OHTL. Next, OHTL are added to the area in order to produce enough rapidly sinking and refractory particulate matter (PM) to sequester carbon dioxide above the level of carbon dioxide sequestration that exists before the addition of OHTL. Finally, this increase in the level of carbon dioxide sequestration is quantified. The method of the present invention may also include the step of reporting the quantified increase in the level of carbon dioxide sequestration. Preferably, OHTL that naturally generate more rapidly sinking and refractory PM as compared to other OHTL are added, for example carnivorous fish. Alternatively, or in addition, the OHTL are fed a diet that increases production of rapidly sinking and refractory PM. For example, planktiverous OHTL could be supplied a diet rich in diatoms rather than non-skeletal OHTL.

Preferably, the PM produced by the OHTL sinks at rates significantly (i.e. statistically significantly) greater than and/or is significantly (i.e. statistically significantly) less biodegradable than that produced by other components of the biological carbon pump. Preferably, the PM produced by OHTL sinks at a rate in the range of at least about 50 m $d^{-1}$ to at least about 5000 m $d^{-1}$. The level of carbon sequestration is preferably increased significantly over that sequestered by other components of the biological carbon pump. Depending on numerous factors, including the species of OHTL added, how the OHTL are added, and the environmental status of the addition area, carbon sequestration is preferably increased in the range of greater than about 50% to greater than about 5000% over the current level of carbon sequestration for the area.

BRIEF DESCRIPTION OF THE FIGURES

The present invention together with its objectives and advantages will be understood by reading the following description in conjunction with the drawings, in which.

DETAILED DESCRIPTION OF THE INVENTION

Area Assessment

Figure 1:
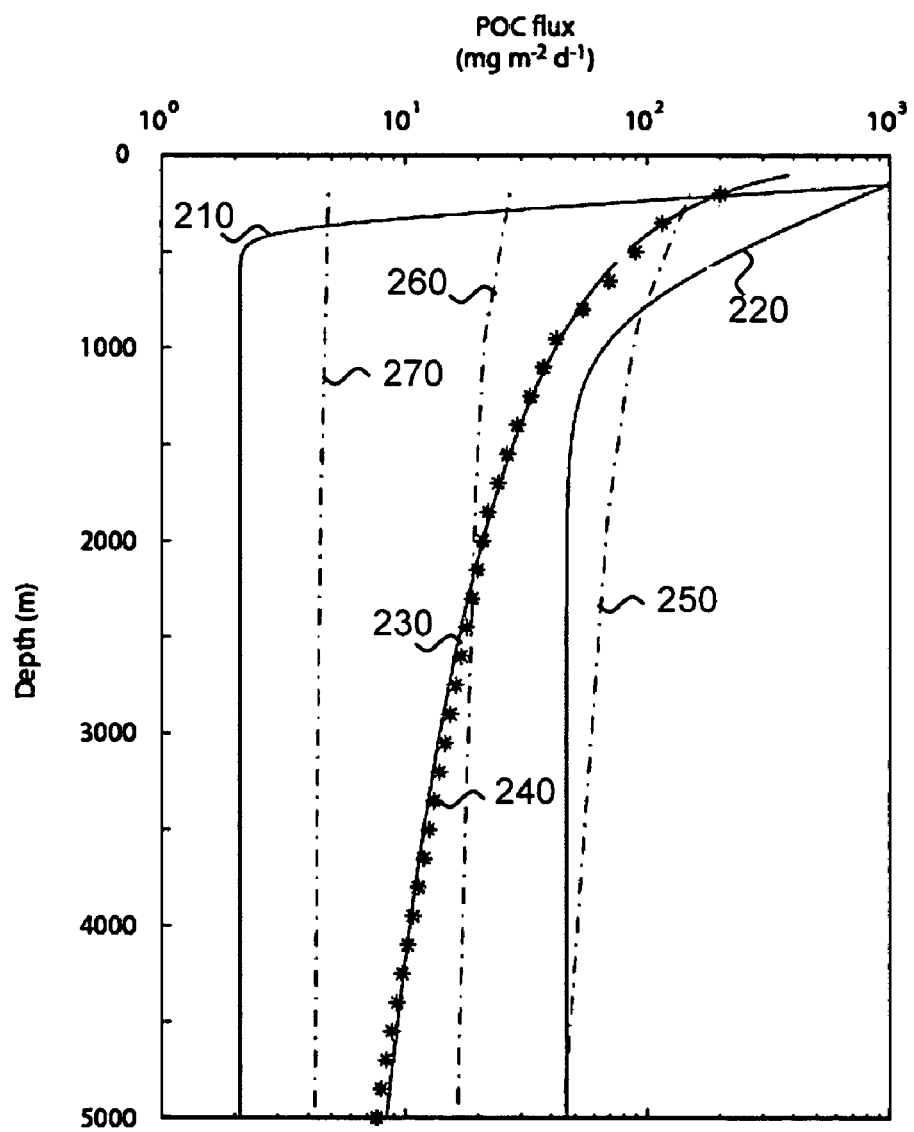
FIG. 1 illustrates the results of a model of the present invention, presented in the text, describing sinking particulate organic carbon (POC), compared to observations of flux to depth derived using sediment trap observations.

The area to which OHTL are added is defined by the natural geographic range of the OHTL and is specific to each OHTL. The geographic extent of the area depends on various factors including the dispersal pattern of the OHTL added, environmental factors (e.g., oceanographic and atmospheric weather), and other physical, chemical, and biological factors. Some OHTL remain within geographically limited and distinct environments, some move between environments as a function of season and biological development, and some forage across great distances.

Whether an area of the ocean is suitable for OHTL addition so that $CO_2$ is sequestered depends on a number of factors. Adding OHTL to an area must be done in an ecologically sound manner. The area must be determined to be within the physical, chemical, and biological tolerance limits of the OHTL. Physical factors that may influence organism survival include light availability, temperature, salinity, and physical pollution. Chemical factors that may exceed physiological tolerance limits of OHTL include diminished oxygen and various forms of pollution. Biological factors are influences from within the organism's community and include the strength of trophic transfer, crowding, predation, grazing, parasitism, invasive species, and competition for oxygen. Additional factors to consider include the timing and location of OHTL within the hydrographic regime of the area. In particular, the timing of OHTL addition ranging in scale from diurnal, to seasonal, to that of longer term climatic phenomena (e.g. El Nino) may significantly influence OHTL survival and the potential for $CO_2$ sequestration. For example, consideration for diurnal biological cycles may help alleviate premature predatory pressure. Similar consideration should be given to the hydrographic regime. For example, the disposition of seasonal currents may significantly impact the potential for juvenile OHTL survival depending on the ecological status of the environment into which the OHTL are advected.

The area must be found to be suitable for $CO_2$ sequestration by determining values of relevant parameters, including water depth, seafloor topography, and biological, chemical, and physical oceanographic dynamics, such as water column carbonate chemistry and biological activity, bottom water dissolved oxygen, and benthic community composition. The values of these parameters will vary depending on OHTL added and the types of habitats to which they belong. For example, $CO_2$ sequestration derived from the addition of pelagic OHTL to regions of upwelling will be promoted by water depths large enough to maintain benthic offshore counter-currents relative to shallower regions with onshore benthic currents that upwell. Similarly, the addition of OHTL to regions where benthic dissolved oxygen concentrations are at anoxic levels will significantly enhance sedimentary carbon sequestration relative to non-anoxic regions. Preferably, benthic oxygen consumption is in the range of at least about $0.3$ mol $O_2$ m$^{-2}$ yr$^{-1}$ to at least about $0.9$ $O_2$ m$^{-2}$ yr$^{-1}$. The life cycle of OHTL added may influence area selection, as organisms may migrate between different environments during growth.

Habitat restoration (e.g. the establishment of marine reserves, the removal of dams, and other measures to improve water quality and ecological health) will further promote OHTL survival and associated $CO_2$ sequestration. Whether an area is suitable for habitat restoration or other indirect means of OHTL addition will depend on a number of factors. The ecological history of the area may need to be assessed to determine the appropriateness of the restoration activity. Furthermore, the establishment of a sustainable reserve to promote $CO_2$ sequestration via OHTL may require the assessment of proposed reserve size and shape, the degree of management required, the environmental health of adjacent habitats, the movement of concerned OHTL, and social anthropogenic pressures (e.g. cultural, political, and economic factors).

Addition of OHTL

The appropriate amount of OHTL added so that carbon dioxide is effectively sequestered will depend on various factors. If too few OHTL are added the community may not be able to sustain itself and reproduction may be limited. The addition of too many OHTL may promote environmental stress causing populations to crash. The number of OHTL added should be optimized such that the carrying capacity of the environment is maintained.

Methods used to add OHTL to the area will depend in part on the nature of the added OHTL. Relevant OHTL characteristics include age, size, feeding activity, recruitment success, dispersal patterns, and ecological roles performed. For example, older and larger OHTL are less prone to predation and thus may be added to a wider variety of environments. Direct methods of OHTL addition include OHTL aquaculture (e.g. juveniles grown in hatcheries) and subsequent release in the ocean and adjacent environments (e.g. estuaries and rivers), and other efforts to minimize recruitment loss. Addition may be preformed in a geographically and temporally spaced manner to limit OHTL competition and promote recruitment success. OHTL may be added to the ocean in enclosures. Indirect methods of OHTL include taking measures to limit OHTL capture, promote OHTL growth, and remove hindrances to OHTL growth. Examples include habitat restoration (e.g., of spawning and mating grounds), establishing marine reserves, reducing pollution (e.g. planting trees and removing roads in catchment areas to reduce runoff), improving water quality, removing dams and weirs, reducing fishing pressure, altering management and market practices, fertilizing the ocean with nutrients, and otherwise encouraging OHTL recruitment, growth, and endurance, and reducing OHTL-related stress.

Optimization of OHTL-related $CO_2$ sequestration may be encouraged by facilitating sustainability, trophic transfer, and the production of refractory and rapidly sinking PM (e.g. supplying planktiverous OHTL a diet rich in diatoms rather than non-skeletal phytoplankton). Supplying OHTL that eat skeletal or cartilaginous material may also increase production of refractory and rapidly sinking PM. $CO_2$ sequestration may also be optimized by supplying OHTL that enable more efficient trophic transfer from primary producers. Examples include foraging homeotherms such as tuna, which have an enhanced energy demand required to maintain high velocity and body temperature.

Optimization may involve research with regards to the status of added OHTL (e.g. abundance and stressors). Ongoing monitoring of ecosystem health and sequestration efficiency will allow for changes to the strategy of OHTL addition and further optimize the degree of $CO_2$ sequestration. Monitoring may include biological indicators (e.g. assessment of overall density, size, biomass, biodiversity, and quality and quantity of waste production of organisms), environmental indications of sequestration efficiency (e.g. assessment of upper ocean turbulence, solar irradiance, water temperature, pollution, and other stressors), and biogeochemical indicators (e.g. assessment of OHTL-associated export, flux to depth, flux to the seafloor, and geological storage) related to $CO_2$ sequestration efficiency. Optimization may be further enhanced by efforts towards complete ecosystem restoration.

Quantification of Carbon Dioxide Sequestration by OHTL

Methods used to measure OHTL-related $CO_2$ sequestration will depend in part on the type of OHTL and how they are added. For example, quantification of $CO_2$ sequestration associated with OHTL that reside in lacustrine, coastal, and open ocean environments may each allow for different measurement techniques. Direct addition of OHTL to an area may allow for the use of tags to track OHTL development and environmental history, and thus more accurately predict carbon sequestration. Indirect OHTL addition via habitat restoration may require a greater degree of ecosystem-scale monitoring to determine carbon sequestration.

Due to the complexity of natural systems, direct field measurement of OHTL-related $CO_2$ sequestration is difficult and tools currently employed are to varying degrees operationally and theoretically limited. Techniques used to directly measure $CO_2$ sequestration include quantification of the biogeochemical and carbonate systems, such as quantifying air-sea $CO_2$ exchange, chemical transformations, and PM flux to depth and sedimentation.

OHTL-related $CO_2$ sequestration may be estimated using appropriate knowledge of ecosystem dynamics. Important ecosystem components include OHTL surveying, primary production, trophic transfer efficiency and biomass, flux to depth, and sedimentation. For example, OHTL-export may be seen as a function of primary production, trophic transfer efficiency, and OHTL biomass. The choice of method will depend on the biology and ecological role of the species, the time scale required, and the area used.

Quantification of OHTL-associated $CO_2$ sequestration may involve experiments conduced in field and or laboratory settings. Quantification may further involve the incorporation of field and laboratory-based results into models and numerical simulations of varying complexity.

Field experiments may include the quantification of OHTL-associated population dynamics, primary production, trophic transfer, and the export, flux to depth, and flux to the seafloor of particulate matter. Field-based experiments may or may not include enclosures (e.g. cages and mesocosms). OHTL biomass may be quantified using numerous methods, including transducer mechanisms, sonar, video, trawlings, hook, and spotting by air. Methods of fishery stock and recruitment assessment may also be used to quantify OHTL biomass. Such methods include direct surveys of fishing activity (e.g. searching time, number of nets set, fishing activity frequency, number of casts, number of operations), independent surveys (e.g. telephone survey, access point intercept, roving instantaneous boat counts, on-site entrance count, logbook data, data from commercial and recreational fisheries), statistical methods, and ecological and fisheries modeling. The provenance of released OHTL may be determined using numerous methods, including tagging, equipping with radio transmitters, scale readings, otolith morphology, geochemistry (e.g. otolith trace element, stable isotopes, and other chemical tracers), and natural and labeled genetic or molecular analysis (e.g. mtDNA analysis).

Field experiments may also be used to determine interactions between OHTL-derived particulate matter and the biological, chemical, and physical status of surface waters, mesopelagic waters, deep waters, benthic sediments and the microenvironment associated with the OHTL-derived particulate matter.

Methods used to measure primary production include radiocarbon methods of various techniques, determining the amount of oxygen released during photosynthesis, determining the amount of functional chlorophyll present, and calorimetry. Primary production is also determined using the optical properties of seawater via various fluorescence methods including submersible in situ fluorometers and remote sensing. Cells and particles numbers and sizes may be determined using a coulter counter. Dark carbon fixation by algae and bacteria may also require quantification.

Methods used to determine the export of carbon from surface waters include the $^{234}Th$ method, mass balances, and estimates of new production. Flux to depth is chiefly characterized using moored, floating, and neutrally buoyant sediment traps. Additional methods include large volume filtration, abundance transmissometer, image analysis (e.g. photographic and laser), radiogenic techniques (e.g. thorium modeled and measured fluxes using $^{234}Th$ deficiency, $^{234}Th$-derived estimates of particulate organic carbon flux using the $C/^{234}Th$ ratio, radiogenic isotopes of lead and palladium), oxygen and other element mass balances, and comparison with sediment accumulation rates. Heterotrophic activity will also influence flux to depth rate estimates and may require quantification.

Flux to the seabed that escapes remineralization and early diagenesis will be practically permanently sequestered. Direct methods for quantifying decomposition and transformation rates during early diagenesis include measuring electron-acceptor consumption or reduced product formation (in pore waters and bottom waters where applicable (e.g. oxygen consumption, denitrification, iron reduction, sulfate reduction, methane production, hydrogen production), remineralization product production (e.g. ammonium production), and remineralization of organic substances (e.g. acetate oxidation, short-chain organic acid oxidation or fermentation, acetate oxidation by surface reduction, amino acid oxidation, glucose uptake by bacteria, methane oxidation, remineralization of algal detritus, bacterial polymers, remineralization of POM). Indirect methods include electron-acceptor consumption (e.g. oxygen consumption, sulfate reduction), remineralization product production (e.g. total carbon dioxide and ammonium production), and decomposition of organic substances (e.g. total organic matter decomposition, organic nitrogen and phosphorus remineralization, total hydrolysable amino acid decomposition). Bacteria abundance may be measured by a variety of methods including epifluorescence microscopy, titrtated thymidine method, titrtated adenine method, and counting the frequency of dividing cells. Additional techniques to quantify early diagenesis include quantification of humic substances and molecular indicators, such as lipids, fatty acids, cyclic triterpenoids and other OM fractions (e.g. steroid and hopanoid compounds), hydrocarbons, lipids (free and bound), and pigments. Methods used may characterize pore waters, bottom waters, and sediments where applicable. Tools applied include incubated cores and jars, benthic flux chambers, isotope dilution, radiotracers (e.g. $^{14}CO_2$, $^{14}CH_4$, $^{15}NH_4$), and models of elemental concentrations. Bioturbation represents a potentially important sedimentary pathway and may also be characterized.

Rates of remineralization of particulate waste may be determined by quantifying the incorporation of particulate matter into microbes and other consumers, extracellular enzymatic activity, production of dissolved products of remineralization, and loss of particulate matter. Techniques applied may include the use of light, fluorescence, and scanning and emission electron microscopy, molecular probes, radiogenic and stable isotope characterization, and organic compound (e.g. lipid, carbohydrate, and protein content) and bulk elemental geochemical analyses. Sinking rates may be determined using settling tubes and apparatus of varying complexity required simulate natural turbulence accurately. The influence of micro-scale turbulence and viscosity must be considered when estimating rates of remineralization and sinking.

Determination of the provenance, trophic transfer, and transformations of OHTL-derived PM in various reservoirs, gut and tissue, water column, and sediments, is important to quantifying OHTL-related $CO_2$ sequestration. Methods include the analysis of molecular biomarkers (e.g. coprostanol), bulk stable isotopes (e.g. $\delta^{13}C$ and $\delta^{15}N$), molecular-level isotopes, elemental ratios (C/N and C/P), microscopic compositional identification, trace element geochemistry, amino acid N, magnetic resonance (e.g. $^{13}C$ and $^{31}P$), spectrofluorescence of humic substances, and radiogenic isotopic analysis, sequencing of proteins, and genetic material extraction. Efficiency of trophic transfer may be estimated by techniques including stable nitrogen isotopes.

The deployment of such devices and performance of such methods in the field may need to be conducted in a manner specifically designed to characterize the activity of OHTL. For example, sinking particulate matter derived from foraging OHTL may not be readily characterized by traditional water column (e.g. moored sediment traps) and sedimentary (e.g. box core sampling) techniques. OHTL-specific observations may need to be conducted (e.g. measurements at specific water mass fronts to capture the feeding and waste production of foraging OHTL). For example, experiments may involve following OHTL to record their bioenergetic and biogeochemical activity in situ. Thus, quantification preferably uses techniques designed with regard for the more heterogeneous spatial distribution of OHTL relative to that of OLTL.

Laboratory experiments may include quantification of OHTL-associated $CO_2$ sequestration dynamics that are not readily measured in the field. Such parameters may include characterization of OHTL-associated bioenergetic and physiological dynamics (e.g. efficiency and rate of feeding, metabolic rate, growth, reproduction, and solid and liquid waste production), and waste products (e.g. the production of fecal pellets and dissolved nutrients). Laboratory experiments may be used to determine parameters relating to OHTL-specific metabolic requirements, quality of ingestion, quantity of ingestion, quality of egestion, quantity of egestion, and quality of excretion of solid and dissolved matter and quantity of excretion of solid and dissolved matter.

Quantification of OHTL-associated $CO_2$ sequestration may involve the synthesis of field- and laboratory-based observations into numerical simulations of varying complexity. Numerical simulations may include empirical algorithms, sensitivity analysis, physics-based modeling, bioenergetic modeling, and modeling of ecosystem and environmental interactions. Models may incorporate environmental data such as solar irradiance, turbulence, mixing, currents, water depth, water temperature, density, biological community composition (e.g. producers and detritivores), and concentrations of dissolved nutrients, and living and detrital particulate matter. For example the $CO_2$ sequestration derived by direct addition of OTHL may be quantified by combining estimates of OHTL ecosystem (e.g. community survival and reproductive success), bioenergetic (e.g. growth, body size, and feeding rate and composition), biogeochemical (e.g. quality and quantity of particulate waste), physical (e.g. the influence of turbulence and viscosity on particle settling rates and availability to remineralization), and environmental (e.g. water depth, turbulence, and temperature) dynamics into a numerical simulation that relates individual OHTL with their characteristic capacity for $CO_2$ sequestration (e.g. field and laboratory determined efficiencies of trophic transfer and associated particulate waste rates of sinking and remineralization). Similarly, the $CO_2$ sequestration due to indirect methods of OHTL addition via habitat restoration may require greater consideration of environmental conditions and ecosystem interactions. Preferably, numerical simulations are based on at least one of size of individual primary producers, viscosity of surface waters, turbulence of surface waters, and retention of small particles within surface waters.

Reporting of Increased Carbon Dioxide Sequestration

The reporting may be accomplished in numerous ways. Reports made be printed on paper or another substrate, or stored as digital data on magnetic or optical data. The report may characterize the amount of $CO_2$ sequestered, the specific techniques employed, and the water column and seabed conditions. The report may include credits for the amount of $CO_2$ sequestered.

Theoretical Basis for OHTL-Mediated Carbon Dioxide Sequestration

While the present invention is not tied to a particular theory, the following describes a possible theoretical basis for the present invention. Marine organisms may be categorized by feeding relationships into trophic levels. For example, phytoplankton are primary producers and constitute trophic level one (TL1); zooplankton feeding on phytoplankton constitute trophic level two (TL2); fish feeding on zooplankton constitute trophic level three (TL3); and so on. Organisms of higher trophic level (OHTL) are those of trophic levels greater than one, such as planktivorous fish, carnivorous fish, and marine mammals. It has previously been thought that phytoplankton are the most crucial portion of the biological pump, as they constitute the largest proportion of biomass on the surface of the ocean. However, the inventor has discovered that OHTL, despite their relatively small contribution to the biomass on the surface of the ocean, constitute a highly efficient and significant portion of the biological pump.

A first step in determining the role of OHTL-derived PM in carbon sequestration was development of a novel classification scheme for PM remineralization. Marine PM is composed of a continuum of particles, each with unique characteristics, including size, sinking rate, and availability to remineralization. Attributes and processes that influence the remineralization of sinking PM can be classified as autochthonous or allochthonous to the particle. Autochthonous properties are defined as those that the particle carries with it as it sinks. Autochthonous properties of particles include sinking rate, physical compaction or density, particle composition (e.g. contribution of silica, carbonate, and organic constituents), physical shielding (e.g. diatomaceous skeletal material and mucus surrounding fecal material), and lability (e.g. refractory and labile organic compounds). These properties influence the different processes for particle decay such as physical disintegration, chemical decay (e.g. enzymatic decomposition), and microbial consumption. In contrast, allochthonous decay processes are defined as those that involve environmental forces where the particle is found while sinking. These forces include physical dynamics of the water (e.g. enzymatic decay as a function of temperature), water chemistry (e.g. carbonate dissolution as a function of temperature and pressure), and the rate of consumption by heterotrophic organisms. Autochthonous and allochthonous processes work together in successive stages to facilitate particle remineralization (e.g. fresh PM is produced, colonized by microbes, consumed and excreted by zooplankton, re-colonized by microbes, and so on).

To determine the role of allocthonous and autochthonous attributes and processes in PM remineralization, the mass of sinking PM was modeled by the following equation:

$$F_{z(t)} = F_{z(t-1)} - D_{aut} - D_{all} \quad \text{(Equation 1)}$$

where
 t=the length of time (days) since the particle was exported below surface waters,
 $F_{z(t)}$=the flux of carbon (mass per area per day) to depth z(t) during the current time step (t), $F_{z(t-1)}$ = the flux of carbon (mass per area per day) to depth $z(t-1)$ during the previous time step $(t-1)$, $D_{aut}$ = the loss of particulate carbon due to autochthonous decay processes (mass/mass) during the time period between time steps $(t-1)$ and $(t)$, and $D_{all}$ = the loss of particulate carbon due to allochthonous decay processes (mass/mass) during the time period between time steps $(t-1)$ and $(t)$.

As the age and depth of sinking PM increase, the mass of sinking PM decreases at a rate equal to the sum of autochthonous and allochthonous decay processes with respect to the sinking particle. Of the parameters composing equation 1, $D_{all}$ is the least well constrained by observations. Rearranging equation 1 allows for $D_{all}$ to be determined using observational estimates of the average rate of sinking PM, $F_z$, and $D_{aut}$:

$$D_{all} = F_{z(t-1)} - F_{z(t)} - D_{aut} \quad \text{(Equation 2)}$$

The commonly cited value from the literature for the average sinking rate of marine PM is $150 \text{ m d}^{-1}$. This value was used to determine the difference in depth between each time step $(z(t-1)-z(t))$. The flux to depth of sinking PM $(F_z)$ has been measured using sediment traps. Sediment traps are conical structures that operate in a similar manner to rain gauges, collecting particles as they sink. Sediment traps measure the mass of sinking PM collected from a known depth, location, and duration. Results from sediment trap experiments typically report observations of bulk material (e.g. total carbon) and thus reflect the entire biological pump. Rates of flux to depth decrease with increasing water depth and vary between ocean regions. Observations of the flux to depth of carbon $(F_z)$ used in this model are presented in Lutz (Lutz, M. J., et al., 2002, Regional variability in the vertical flux of particulate organic carbon in the ocean. Global Biogeochemical Cycles 16(3), 1037) and Suess (Suess et al., 1980, Particulate organic carbon flux in the oceans—surface productivity and oxygen utilization, Nature, 288, 260-263). The rate of autochthonous remineralization $(D_{aut})$ reflects the proportional loss of labile material relative to refractory components. A value of 4% $d^{-1}$ was used to approximate rates from the literature.

Model results using the values given above indicate $D_{all}$ can be described by the following exponential decay equation:

$$D_{all} = a * \exp(-b * t) \quad \text{(Equation 3)}$$

where $a=0.505$ and $b=0.000133$. Parameters a and b characterize $D_{all}$ for the average bulk carbon of sinking PM. The exponential decrease of $D_{all}$ as water depth and time since particle export increase is consistent with a reduction in heterotrophic activity as water depth increases. This model shows that $D_{all}$ dominates the decay of sinking particles, accounting for 4 to 6 times that of $D_{aut}$ at depths between 500 and 1500 m. Because $D_{all}$ is significantly greater than $D_{aut}$, processes that facilitate the rapid transfer of PM to the deep ocean and sediments would therefore significantly reduce the potential for the remineralization of PM in the upper water column.

The ability of the biological pump to sequester carbon in the deep ocean and sediments is influenced by the amount of primary production, the fraction of primary production received by OHTL (i.e. the efficiency of trophic transfer) and the sinking and remineralization rates of PM produced by each trophic level. Trophic transfer efficiency depends on food quality, consumer physiology (e.g. activity), and the abundance of consumers relative to food. Labile food will be consumed and assimilated more readily. Because phytoplankton are relatively labile, they are associated with efficient trophic transfer. Thus, trophic transfer between the first two trophic levels is estimated between 60% to 99% (Chapin, F. S., et al., 2002, Principles of terrestrial ecosystem ecology. Springer-Verlag). Furthermore, consumption and assimilation efficiency will depend on phytoplankton species composition. Trophic transfer between trophic levels of greater than two typically ranges between 10% to 25%. This range reflects variability between ocean regions of different productivity and the ecosystems they support. Furthermore, physiological requirements of some OHTL indicate enhanced trophic transfer (e.g. the enhanced energy demand required to maintain high velocity and body temperature of foraging homeotherms, such as tuna).

Using estimates of trophic transfer values along with equations one, two, and three, the above model was used to simulate the average efficiency of the flux to depth of PM derived from the biological pump for trophic levels two, three, and four (FIG. 1). Estimates of flux to depth were derived assuming a primary production of $1000 \text{ mg C m}^{-2} \text{ d}^{-1}$. The estimate uses a trophic transfer efficiency of 75% between trophic levels one and two, and 18% between higher trophic levels. Rates of sinking and autochthonous remineralization for trophic level one (i.e. phytodetritus) were estimated using sediment trap observations (as indicated above; $150 \text{ m d}^{-1}$ and 4% $d^{-1}$, respectively). Because sediment trap observations may include matter derived from other trophic levels this is assumed to be a maximum estimate. Sediment trap observations are probably more representative of lower trophic levels whose geographic distribution is more uniform. As trophic levels increase, sinking rates were estimated to increase by a factor of 2½ per trophic level and autochthonous remineralization rates were estimated to decrease by 0.5% $d^{-1}$ per trophic level. Allochthonous remineralization was estimated as described above (equation 3).

In FIG. 1, solid lines 210 and 220 show the minimum and maximum, respectively, of flux to depth observations from various global regions (Lutz et al., 2002). Solid line 230 shows the global average estimate of POC flux to depth observations (Suess et al., 1980). Star symbols 240 represent the results of the above flux to depth model used to determine the rate of allochthonous decay (equations 1, 2, and 3). Dashed and dotted lines 250, 260 and 270 indicate estimates of the average POC flux to depth originating from the second, third and fourth trophic levels, respectively.

This simulation indicates that as trophic levels increase the mass of export from each trophic level decreases and flux to depth efficiency increases. FIG. 1 shows flux to depth derived from trophic level two (250) approaches the maximum of regional estimates (220) and that flux to depth derived from trophic level three (260) approaches the average of sediment trap observations (230). Flux to depth to the deep ocean (at 3000 m) for the OHTL-associated portion of the biological pump, the sum of trophic level two, three, and four, is 40% of export from surface waters (i.e. flux at 150 m) and 8% of primary production. If trophic transfer is more efficient, as in coastal and upwelling regions (i.e. 90% between trophic levels one and two, and 25% between higher trophic levels), the efficiency of flux to the deep ocean derived from this portion of the pump reaches 50% of export and 10% of primary production. The theoretical maximum limit for the efficiency of flux to depth of OHTL-derived particulate material is 100% of export, which may occur when the distance that PM sinks in a day nears the depth of water.

The above simulation suggests that at higher trophic levels flux to depth (as sinking rates increase and remineralization rates decrease) and burial (as remineralization rates decrease) are more efficient. This may be true for many reasons. If particles are too small they may not escape suspension. The larger the sinking particle, the more rapid its descent. OHTL produce large corpses, among the largest particles in the ocean, which sink rapidly to the seafloor. OHTL also produce large, rapidly sinking fecal matter (pellets). Thus, sinking rates of OHTL-derived particles are generally greater than those of lower trophic levels. The rapid passage of OHTL-derived PM through the water column may significantly reduce its availability to heterotrophic consumption and remineralization within the upper ocean (approximately <1.5 km) and increase the likelihood it will reach the deep ocean (approximately >1.5 km) and sediment before remineralization occurs.

Another factor that may contribute to the more efficient flux to depth and burial of OHTL-OHTL-derived PM is the refractory nature of OHTL-derived PM compared to other sinking PM. This may be due to a variety of causes. OHTL produce compact fecal pellets that resist physical disintegration and chemical and biological decay. These fecal pellets may be enclosed in mucus, further inhibiting decay, and may be shaped so as to encourage descent. In addition, gut passage greatly reduces the mass of phytoplankton-derived detritus as more labile material is absorbed; the mass of ingestion is much less than egestion.

Similarly, the lability of waste may decrease as trophic level increases. Because during feeding labile components of food are preferentially removed, OHTL produce waste PM that is of less nutritive value than their food sources (e.g. heterotrophic fecal pellets versus phytodetritus). For example, heterotrophs feeding on phytodetritus (e.g. zooplankton and planktivores) produce more labile waste than omnivores and carnivores feeding on heterotrophs. OHTL also produce refractory cellular and body components (e.g. bones and fish scales) that resist decay upon mortality. Physiological demand of the consumer may also influence the lability of egested PM (e.g. due to high organism energy demand).

As stated above, the simulation suggests that the OHTL-derived portion of the biological pump produces particulate matter that is more readily buried. Thus, this portion of the biological pump may add to the long-term carbon cycle of the geosphere. As stated above, remineralization rates generally decrease with increasing trophic level. Hence, PM produced by OHTL is less probably remineralized by benthic organisms. Because most remineralization occurs within the upper 10 cm of marine sediments, as sedimentation rates increase, availability to decay decreases. Thus, the high rates of sedimentation noted above associated with OHTL promote the burial of sediments enriched in organic carbon. Furthermore, if OHTL-derived organic matter accumulates rapidly enough, benthic oxygen concentrations will fall to levels that will further limit the activity of benthic heterotrophs. In addition, as water depth increases the ratio of OHTL- to non-OHTL-derived PM increases. Thus, the proportional mass of OHTL-derived PM is greater for PM settling on the seafloor compared to PM exported from surface waters. Hence, OHTL-derived PM is more likely to be preserved in sediments. As indicated above, compared to other PM settling on the seafloor (e.g. phytodetritus), OHTL-derived PM is more refractory. Because OHTL-derived PM is of less nutritive value to benthic consumers it is more likely to be preserved in sediments. Hence, through a variety of means, the portion of the biological pump influenced by OHTL represents a portion that is responsible for more efficient carbon sequestration in the deep ocean and sediments.

Figure 2:
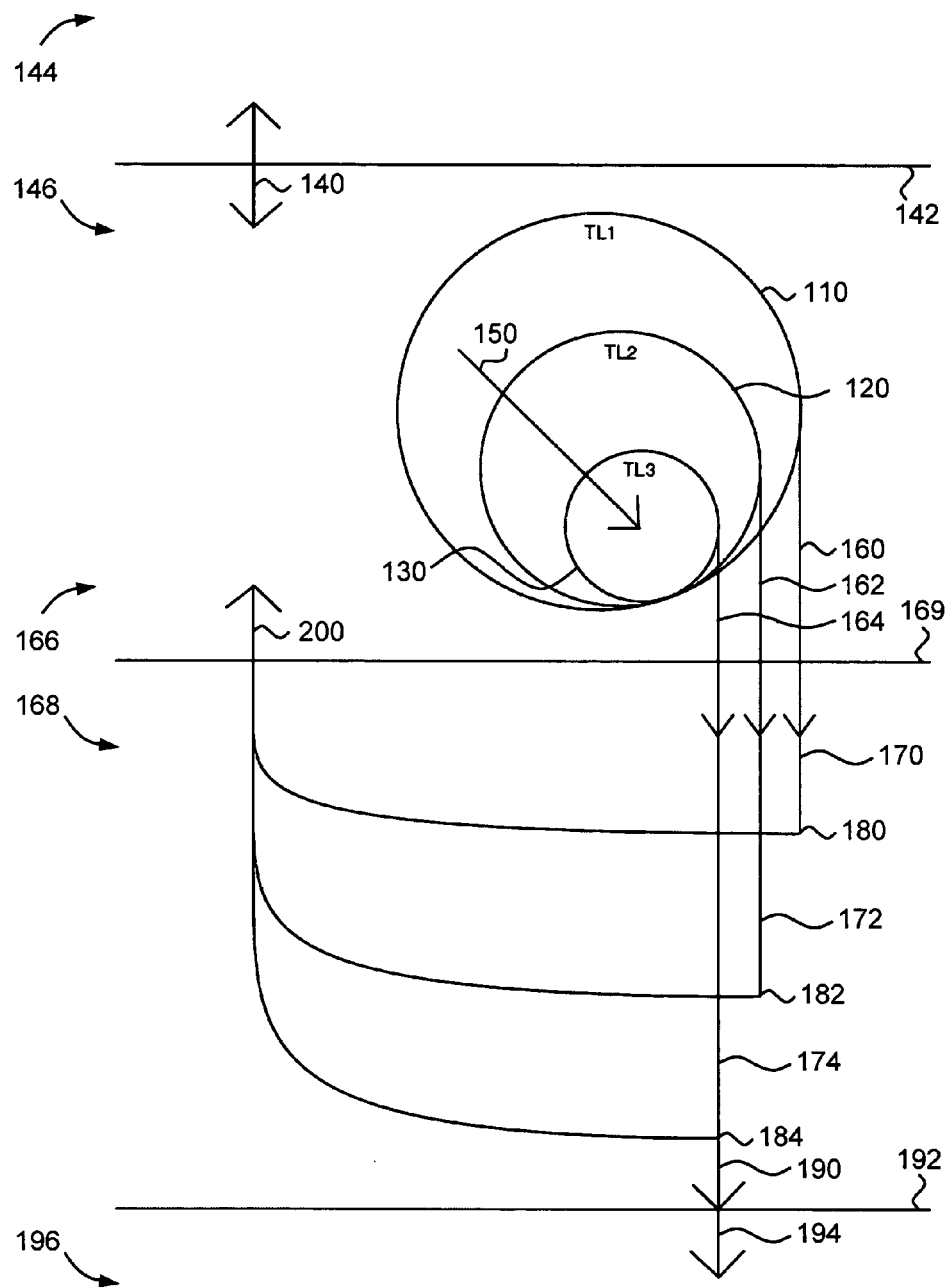
FIG. 2 shows a simplified illustration of $CO_2$ sequestration in the ocean and marine sediments via a trophic pump according to the present invention.

The simulation using equation 1 shown above lead to the understanding of the OHTL-associated highly efficient component of the ocean's biogenic carbon cycle, herein defined as the trophic pump (FIG. 2). The trophic pump describes how OHTL produce relatively refractory biogenic particulate matter that settles rapidly and avoids shallow remineralization, therefore contributing to long-term ocean carbon storage and burial in the geosphere. In FIG. 2, circle 110 represents trophic level 1 (TL1), circle 120 represents trophic level 2 (TL2) and circle 130 represents trophic level 3 (TL3). Circles represent productivity and recycling within each trophic level. Arrow 140 indicates the flux of $CO_2$ across atmosphere-ocean interface 142 driven by the gradient in partial pressure between atmosphere 144 and ocean 146. Arrow 150 indicates the flow of carbon as it ascends the first three trophic levels. Arrows 160, 162 and 164 indicate export of carbon from trophic levels one, two and three, respectively from surface waters 166 to deep ocean 168 through base of the depth of export (i.e. the maximum of the euphotic zone and mixed layer depths during flux formation) 169. Arrows 170, 172, and 174 indicate particulate carbon flux to depth from trophic levels one, two and three, respectively. Arrows 180, 182, and, 184 indicate regeneration at depth of particulate carbon derived from trophic levels one, two and three, respectively. Arrow 190 indicates flux of carbon to the seafloor 192. Arrow 194 indicates burial of carbon (i.e. carbon not remineralized by benthic and early diagenetic processes) in sediment 196. Arrow 200 indicates the advective return of regenerated nutrients to surface waters. The trophic pump indicates that carbon cycling through higher trophic levels is more likely to be sequestered for longer durations than carbon cycling through lower trophic levels. This difference is because OHTL-associated particulate carbon (e.g. fecal material) is in general more refractory and sinks more rapidly than OLTL-associated carbon. OHTL-associated carbon is thus remineralized at greater water depths and more readily incorporated in the sediments to be geologically stored.

The method for carbon sequestration described by the invention is not limited to the ocean. This invention applies equally to all aquatic OHTL (e.g. freshwater and brackish), as well as marine OHTL.

The method described by the invention will enhance the sequestration of certain pollutants, chemical compounds, and elements, as well as carbon. For example, bioamplification causes certain elements and chemicals (e.g. heavy metals, PCB's, and DDT) to concentrate in the tissue of OHTL. This invention will enhance the removal of these pollutants from surface waters as either particulate waste generated by OHTL or as sinking corpses.

The method described by the invention will also enhance primary production. OHTL rapidly and efficiently recycle nutrients. Liquid waste generated by OHTL is more readily available to some primary producers than generated by other decomposers (e.g. bacteria). Furthermore, returning OHTL to environments from which they have been historically removed may help ecosystems perform more naturally and healthily.

As one of ordinary skill in the art will appreciate, various changes, substitutions, and alterations could be made or otherwise implemented without departing from the principles of the present invention. Accordingly, the scope of the invention should be determined by the following claims and their legal equivalents.

The invention claimed is:

1. A method of sequestering carbon dioxide in aqueous environments comprising:
   a) assessing an area of said aqueous environment to determine whether said area is capable of supporting addition of OHTL, wherein said assessing comprising determining whether said area is within physical, chemical or biological tolerance limits of said OHTL;

b) adding OHTL to said area to produce particulate matter, wherein said production of particulate matter is sufficient to increase carbon dioxide sequestration above the current level of carbon dioxide sequestration in said area; and c) quantifying said increase in carbon dioxide sequestration in said area.

2. The method as set forth in claim 1, wherein said OHTL addition produces particulate matter that sinks at a rate significantly greater than particulate matter produced from other components of the biological carbon pump.

3. The method as set forth in claim 1, wherein said OHTL addition produces particulate matter that is significantly more refractory than particulate matter produced from other components of the biological carbon pump.

4. The method as set forth in claim 1, further comprising reporting said quantified increase.

5. The method as set forth in claim 4, wherein said reporting further comprises reporting techniques employed for carbon dioxide sequestration, water column conditions, surface conditions, or seabed conditions.

6. The method as set forth in claim 1, further comprises supplying a diet to said OHTL that assists said OHTL in producing rapidly sinking and refractory particulate matter.

7. The method as set forth in claim 6, wherein said diet is rich in components that promote the production of refractory particulate waste matter.

8. The method as set forth in claim 7, wherein said components comprise diatoms, cartilaginous matter or skeletal matter.

9. The method as set forth in claim 1, further comprising determining the appropriate geographic extent of said area.

10. The method as set forth in claim 9, wherein said determining is based on at least one of the dispersal pattern of said added OHTL, environmental factors, physical factors, biological factors and chemical factors.

11. The method as set forth in claim 1, wherein said assessing comprises determining values of parameters relevant to carbon dioxide sequestration, wherein said parameters include at least one of water depth, seafloor topography, biological dynamics, chemical dynamics, temperature, benthic dissolved oxygen, hydrographic regime and physical oceanographic dynamics.

12. The method as set forth in claim 1, wherein said adding comprises at least one of directly adding OHTL to said area and inducing OHTL to migrate to or reproduce in said area.

13. The method as set forth in claim 1, wherein said OHTL are fish, marine mammals, or marine reptiles.

14. The method as set forth in claim 1, wherein said OHTL are carnivorous.

15. The method as set forth in claim 1, wherein the amount of adding is optimized such that the carrying capacity of the environment is maintained.

16. The method as set forth in claim 1, wherein said quantifying comprises at least one of direct field measurement, laboratory experiments, field experiments, estimation based on ecosystem dynamics, and construction of numerical simulations.

17. The method as set forth in claim 16, wherein said numerical simulations are based on at least one of size of individual primary producers, viscosity of surface waters, turbulence of surface waters, and retention of small particles within surface waters.

18. The method as set forth in claim 1, wherein said quantifying comprises at least one of quantifying OHTL-associated population dynamics, measuring export of particulate matter, quantifying flux to depth and flux to seafloor of particulate matter, measuring primary production, determining export of carbon from surface waters, quantifying early diagenesis, characterizing bioturbation, determining the provenance and biogeochemical transformations of OHTL-derived particulate matter, and quantifying OHTL-associated carbon dioxide sequestration dynamics.

19. The method as set forth in claim 1, wherein said quantifying comprises determining OHTL-specific physiological and biogenergetic relationships, wherein said determining comprises determining at least one of parameters describing OHTL-specific metabolic requirements, quality of ingestion, quantity of ingestion, quality of egestion, quantity of egestion, and quality of excretion of solid and dissolved matter and quantity of excretion of solid and dissolved matter.

20. The method as set forth in claim 1, wherein said quantifying comprises determining interactions between OHTL-derived particulate matter and at least one of the biological, chemical, and physical status of: a) surface waters; b) mesopelagic waters; c) deep waters; d) benthic sediments; and e) the microenvironment associated with said OHTL-derived particulate matter.

21. The method as set forth in claim 1, wherein said quantifying comprises techniques designed with regard for the more heterogeneous spatial distribution of OHTL relative to that of OLTL.

22. The method as set forth in claim 1, further comprising quantifying OHTL biomass after said adding.

23. The method as set forth in claim 1, further comprising taking measures to sustain said OHTL in said area, wherein said measures comprise limiting OHTL capture, promoting OHTL growth, or removing hindrances to OHTL growth.

24. The method as set forth in claim 1, wherein said adding is performed in a geographically and temporally distributed manner.

* * * * *